(12) United States Patent
Maierean

(10) Patent No.: US 11,356,444 B2
(45) Date of Patent: *Jun. 7, 2022

(54) PROTECTED USER INFORMATION VERIFICATION SYSTEM

(71) Applicant: CALLFIRE, INC., Santa Monica, CA (US)

(72) Inventor: Radu Maierean, Los Angeles, CA (US)

(73) Assignee: CALLFIRE, INC., Santa Monica, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/746,554

(22) Filed: Jan. 17, 2020

(65) Prior Publication Data

US 2020/0296101 A1 Sep. 17, 2020

Related U.S. Application Data

(63) Continuation of application No. 16/370,751, filed on Mar. 29, 2019, now Pat. No. 10,542,003.

(60) Provisional application No. 62/691,501, filed on Jun. 28, 2018.

(51) Int. Cl.
*G06F 21/00* (2013.01)
*H04L 9/40* (2022.01)

(52) U.S. Cl.
CPC ........ *H04L 63/0884* (2013.01); *H04L 63/126* (2013.01)

(58) Field of Classification Search
CPC .................... H04L 63/126; H04L 63/0884
See application file for complete search history.

(56) References Cited

U.S. PATENT DOCUMENTS

| | | | |
|---|---|---|---|
| 8,689,279 B2 | 4/2014 | Basmov | |
| 8,813,181 B2 | 8/2014 | Willis | |
| 2002/0184504 A1* | 12/2002 | Hughes | H04L 9/3247 713/177 |
| 2010/0293382 A1* | 11/2010 | Hammad | H04L 9/3234 713/173 |

* cited by examiner

*Primary Examiner* — Ghazal B Shehni
(74) *Attorney, Agent, or Firm* — Knobbe, Martens, Olson & Bear, LLP

(57) ABSTRACT

Systems and methods for protected verification of user information are provided. Multiple computing systems may transmit or receive communications from one or more other computing systems as part of the protected user information verification. For example, a user may utilize a verification service to independently verify the user's information to third-party systems without the verification service actually storing, receiving, accessing, or otherwise coming into contact with the user-specific information that it is verifying. In this way, the system can protect a user's personal information while streamlining the user's verification with one or more third parties.

18 Claims, 10 Drawing Sheets

PROTECTED USER INFORMATION VERIFICATION SYSTEM

CROSS-REFERENCE TO RELATED APPLICATIONS

The present application is a continuation of U.S. patent application Ser. No. 16/370,751, filed on Mar. 29, 2019 and entitled "PROTECTED USER INFORMATION VERIFICATION SYSTEM," which claims priority to U.S. Provisional Patent Application No. 62/691,501, filed on Jun. 28, 2018 and entitled "PROTECTED USER INFORMATION VERIFICATION SYSTEM," the contents of each of which are incorporated by reference herein.

BACKGROUND

The exchange of personal information over communication networks may be performed to confirm information regarding an individual. For example, a web site may allow a user to register an account. In order to confirm the user's contact information, identity, or other user-specific information, the web site may send a separate communication to the user using contact information provided by the user. Illustratively, the communication may include a verification code. The user may then access the communication and provide the verification code back to the web site, thereby allowing the web site to verify the user's contact information.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1A:
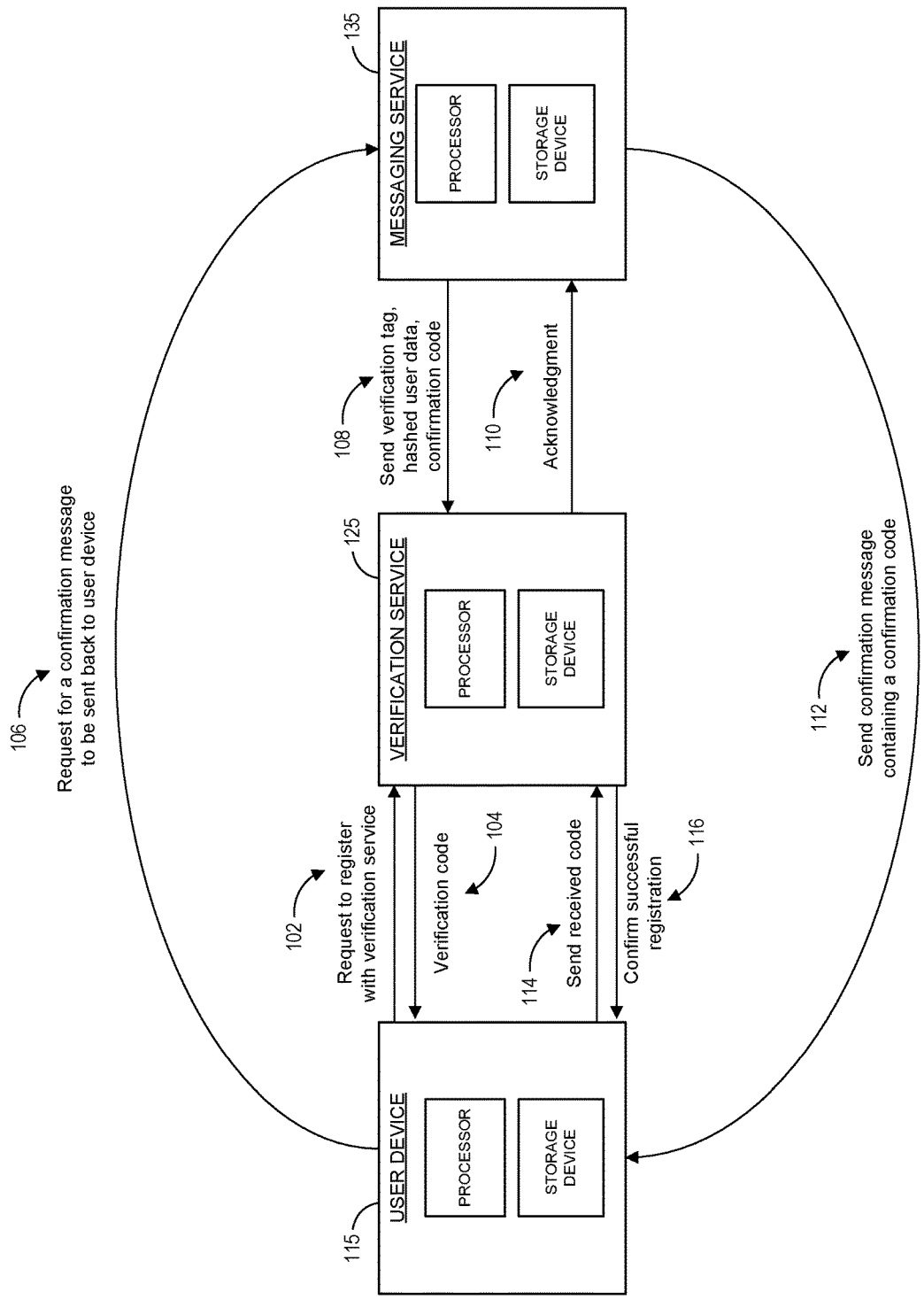
FIG. 1A is a block diagram showing example data flows and interactions between a user device, verification service, and messaging service during a setup process according to some embodiments.

The present disclosure is directed to a system that provides protected verification of user information. In some implementations, multiple computing systems may participate in protected user information verification, transmitting or receiving information from one or more other computing systems (e.g., a user device, a verification service, and a messaging service). For example, a user may wish to use the verification service to verify, to a third-party system, user-specific information without the user providing the user-specific information to the verification service. The user may use a user device to initiate a process by which a version of the user-specific information that has been irreversibly encoded, either in absolute terms or for practical purposes (e.g., a cryptographic hash), is provided to the verification service. Subsequently, the user device may provide the user-specific information to a third-party system (e.g., a web site associated with products or services of interest to the user). The third-party system can generate a version of the user-specific that has been irreversible encoded in the same manner, and request verification thereof from the verification service. In this way, the verification service can serve as an independent verifier of user-specific information for the user to any number of third-party systems without the verification service actually receiving, storing, or otherwise accessing the uuencoded user-specific information that it is verifying. Thus, the risk of the user's personal information being exposed by a data breach or other security event involving the verification service may be eliminated. In addition, because the verification service can handle verification of the user's personal information, the user does not need to perform separate verification processes each time the user provides the personal information to an entity, and entities do not need to prompt users to participate in interactive verification processed. Thus, the overall effort, latency, and potential for human error are reduced.

Some systems verify certain user-specific information (e.g., email address, phone number, etc.) by sending separate communications upon which the user must act. For example, a consumer interested in buying a product from an online retailer may need to first register with the online retailer by providing personal information to the retailer, such as an email address, home address, phone number, etc. The retailer may then send an communication to the user (e.g., via the provided email address or phone number), and require the user to access the communication and perform some verification operation (e.g., respond to the email, click on a verification link, provide a code sent in at text message, etc.). Confirming the identity or other information of an individual in this way requires additional steps to be performed by the user, requires giving the verifying entity (the retailer in this example) direct access to the user's personal information, and does not utilize an independent verification service.

Aspects of the present disclosure provide solutions to problems arising in the verification of user-specific information, such as the problems described above. In some embodiments, a verification service is used to verify a user's personal information without granting the verification service access to the personal information being verified. For example, a verification service may receive a request, from a user device, to serve as a verifier of user-specific information for a user of the user device. Illustratively, the user-specific information may include contact information (e.g., email address, phone number, mailing address), identification information (e.g., name, social security number, driver license number, passport number, password), payment information (e.g., credit card number, bank account number), other information, or some combination thereof. However, the user-specific information to be verified may not be provided to the verification service (or not provided in unencrypted or otherwise usable form). Rather, the verification service may receive or generate user identifier information (e.g., a unique identification code), generate a verification tag associated with the identifier information, and provide the verification tag to the user device. The verification service may subsequently receive, from a separate service or system (e.g. a messaging service), the verification tag and hashed data representing the user-specific information to be verified (e.g., an encrypted version of the user-specific information, such as a hash). The verification service may then store the hashed data in connection with the verification tag. Thus, the verification tag can serve as a unique identifier for the hashed data. The verification service may provide confirmation data (e.g., a unique confirmation code) to the messaging service, which then forwards the confirmation data to the user device. When the user device subsequently provides the confirmation data to the verification service (e.g., without going through the messaging service), the verification service can then be sure that the hashed data, received from the messaging system, represents the user-specific information that the user wishes the verification system to verify to third parties. An item of user-specific information that has been verified in this manner may be referred to as a user-verified data entity.

Additional aspects of the present disclosure relate to use of the verification service to verify user-specific information to third parties on behalf of the user, without the verification service accessing the user-specific information and without necessarily requiring additional action by the user. In some embodiments, the user device may provide user-specific information to a third-party system, such as a web site with which the user wishes to register an account. The user device may also provide the verification tag to the third-party system. The third-party system may then contact the verification service to verify the user-specific information. For example, the third-party system may encode the user-specific information (e.g., by generating a hash), and provide the hashed data and the verification tag to the verification service. The verification service can access its copy of the hashed data associated with the verification tag for the user, and compare its copy to the hashed data received from the third party. The verification service can then respond to the third-party system with a message indicating whether user-specific information could be verified, without the verification service accessing the user-specific information directly. In addition, the third-party system can obtain such verification without requiring additional actions by the user.

Although aspects of some embodiments described in the disclosure will focus, for the purpose of illustration, on particular examples of verification services, user-specific information, and methods of protected user information verification, the examples are illustrative only and are not intended to be limiting. In some embodiments, the techniques described herein may be applied to additional or alternative verification services, user-specific information, methods of protected user information verification, and the like. For example, although embodiments described herein focus on the verification of user-specific identifying information, other types of information may also or alternatively be verified. As another example, although embodiments described herein focus on the use of hashing to obfuscate the user-specific information being verified, other methods may be used to provide one-way obfuscation of the user-specific information or otherwise protect it from being used without user permission. Various aspects of the disclosure will now be described with regard to certain examples and embodiments, which are intended to illustrate but not limit the disclosure.

Example Verification Setup System

With reference to an illustrative embodiment, FIG. 1A shows an example verification setup system in which aspects of the present disclosure may be implemented. As shown, the verification setup system may comprise multiple computing systems, each configured to receive, process, transmit, or store information. In some embodiments, the multiple computing systems may exchange information via a network, which could be any combination of communication networks, such as telephony networks, local area networks, wide area networks, or the Internet.

By way of example, the system embodied in FIG. 1A comprises a user device 115, a verification service 125, and a messaging service 135. The user device 115, verification service 125, and messaging service 135 may each comprise one or more hardware processors configured to receive, process, and transmit information. Furthermore, the user device 115, verification service 125, and messaging service 135 may also each include one or more computer-readable storage devices (e.g., high density disks, solid state drives, flash drives, or other non-transitory computer-readable media) configured to store data or computer-readable program instructions for causing a processor to carry out aspects of the present disclosure.

In an example verification setup system, the user device 115 may initially send a request 102 to register with the verification service 125. The verification service 125 may generate a verification tag, and send a response 104 with the verification tag to the user device 115. Illustratively, the verification tag may be a token, identification code, or other tag that facilitates the verification registration process, and subsequent verification processes, by uniquely identifying the particular item of information (e.g., user-verified data entity) to be verified. After receiving the verification tag from the verification service, the user device 115 may send a direct message 106 to the messaging service 135 requesting that a confirmation message be sent back to the user device 115. In some embodiments, the message 106 may comprise the verification tag and user-specific identifier information (e.g., a mailing address or a phone number).

Upon receiving the message 106 (or at some time thereafter), the messaging service 135 may encrypt, hash, encode, pad, scramble, transform, manipulate, and/or otherwise obfuscate the received user-specific identifier information to generate hashed identifier data. The messaging service 135 may transmit a message 108 containing the verification tag and hashed identifier data to the verification service 125. In some embodiments, the message 108 may include a confirmation code, generated by the messaging service 135, that the verification service 125 can expect to receive from the user device 115. Illustratively, the confirmation code may be a token, identifier, or other code that facilitates the verification registration process by confirming that the user device 115, verification service 125, and messaging service 135 are all participating in the same verification registration process.

Once the verification service 125 receives message 108, the verification service 125 may confirm that it generated (or otherwise has a record of) the verification tag, and transmit an acknowledgement message 110 to the messaging service 135. The messaging service may send a confirmation message 112, including the confirmation code, to the user device 115. The user device 115 may receive the confirmation message 112, process the confirmation code, and then send a message 114 containing the received confirmation code back to the verification service 125. Once the verification service 125 receives the message 114 from the user device and verifies that it has previously received (or otherwise has a record of) the confirmation code, the verification service 125 may respond with a message 116 confirming successful registration.

Although FIG. 1A and the description thereof generally relate to a synchronous order of operations and transmissions, some implementations may not necessarily rely on the same sequence. In some embodiments, certain operations and/or transmissions may be performed in another order, in parallel, asynchronously, etc. For example, the verification service 125 may generate the confirmation code and send it to the messaging service 135 (e.g., in acknowledgement message 110) rather than receiving it from the messaging service 135 in message 108. As a further example, the messaging service 135 may not send the hashed identifier data to the verification service 125 until after receiving the acknowledgement message 110. As a further example, upon receiving the request 102, the verification service 125 may transmit, to the messaging service 135, a message including a verification code and instructions for the messaging service 135 to request that the user device 115 provide the user-specific identifier information to the messaging service 135. Upon receiving the user-specific identifier information from the user device 115, the messaging service 135 may then transmit, to the verification service 125, a message containing the hashed identifier data. The messaging service 135 may also transmit, to the user device 115, a message containing the verification code and the hashed identifier data to the user device 115. The user device 115 may then provide the verification code to the verification service 125. These examples are illustrative only, and are not intended to be exhaustive or limiting.

Example Protected User Information Verification System

Figure 1B:
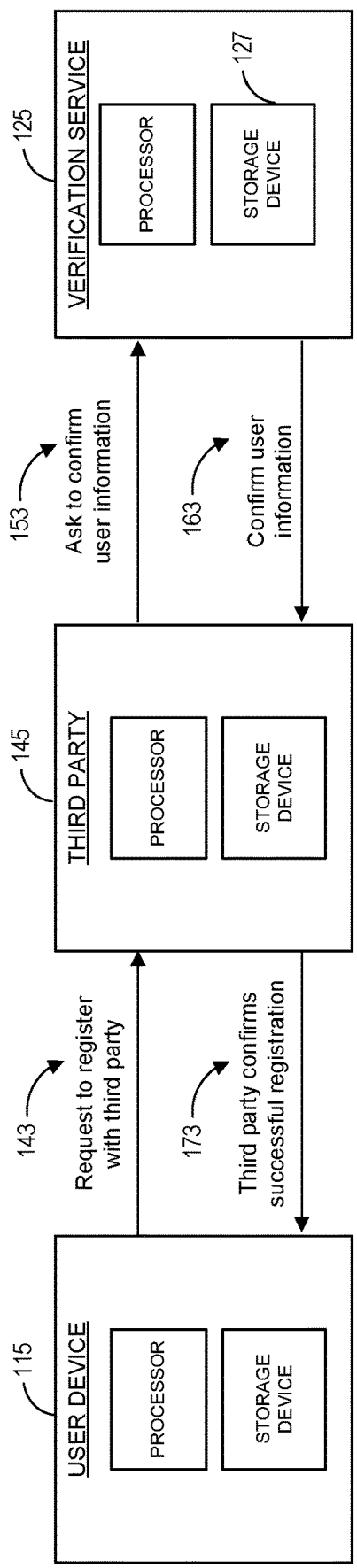
FIG. 1B is a block diagram showing example data flows and interactions between a user device, verification service, and a third-party system during verification of user information according to some embodiments.

FIG. 1B shows an example system configured to execute protected user information verification, assuming that an initial setup such as the example embodied in FIG. 1A has been successfully completed. The example system embodied in FIG. 1B may include a user device 115, a third-party system 145, and a verification service 125. In some embodiments, the third-party system 145 may be a commercial retailer, a professional organization, an association, a social group, an electronic service, or any other entity that may wish to confirm the identity of an individual seeking to interact with the entity, or otherwise verify the authenticity of user-specific information provided to the entity. For illustrative purposes, the user device 115 and verification service 125 in FIG. 1B are identical to the user device and verification service embodied in FIG. 1A, but this is not meant to limit the present disclosure in any way.

The user device 115 may send a request 143 to register with the third-party system 145 (e.g., by accessing a "registration" web page of the third-party system 145). The third party system 145 may request a user-verified data entity, as discussed in more detail later in the disclosure. For example, the third-party system 145 may include a field for "phone number," "address," etc. Assuming the user device 115 previously registered with the verification service 125 (e.g., as in FIG. 1A), the user device 115 may provide the requested information. In addition to providing the requested information, the user device 115 may provide the verification tag for the requested information.

Upon receiving the user-specific identifier information and verification tag from the user device 115, the third-party system 145 may encrypt, hash, encode, pad, scramble, transform, manipulate, and/or otherwise obfuscate the received user-specific identifier information to generate a hashed data entity. The third party system 145 may send to the verification service 125 a request 153 to verify that the received information is correctly associated with the user. The request 153 may include the hashed data entity and the verification tag. The verification service 125 may compare the hashed data entity to the hashed identifier data associated with the verification tag stored in storage device 127 (e.g., compare the hashed data entity received from the third party system 145 to the hashed user-verified data entity previously stored as described in greater detail above). If the two pieces of hashed identifier data match, the verification service 125 may then send a confirmation message 163 to the third-party system 145, providing confirmation that there was a match. In some embodiments, the third-party system 145 may transmit confirmation message 173 to the user device 115 to provide notice of a successful registration with the third-party system 145.

Although FIG. 1B and the description thereof generally relate to a synchronous order of operations and transmissions, some implementations may not necessarily rely on the same sequence. In some embodiments, certain operations and/or transmissions may be performed in another order, in parallel, asynchronously, etc. For example, the third-party system 145 may request that the verification service 125 provide the hashed identifier data associated with the verification tag. In this implementation, the third-party system 145 compares the hashed identifier data received from the verification service 125 to the hashed identifier data that the third-party system 145 generated. Thus, in some embodiments the user-specific identifier data can be verified by either the verification service 125 or third-party system 145. However, in both instances the un-hashed or otherwise un-obfuscated user-specific identifier data is not sent to the verification service 125. These examples are illustrative only, and are not intended to be exhaustive or limiting.

Protected User Information Verification

Figure 2:
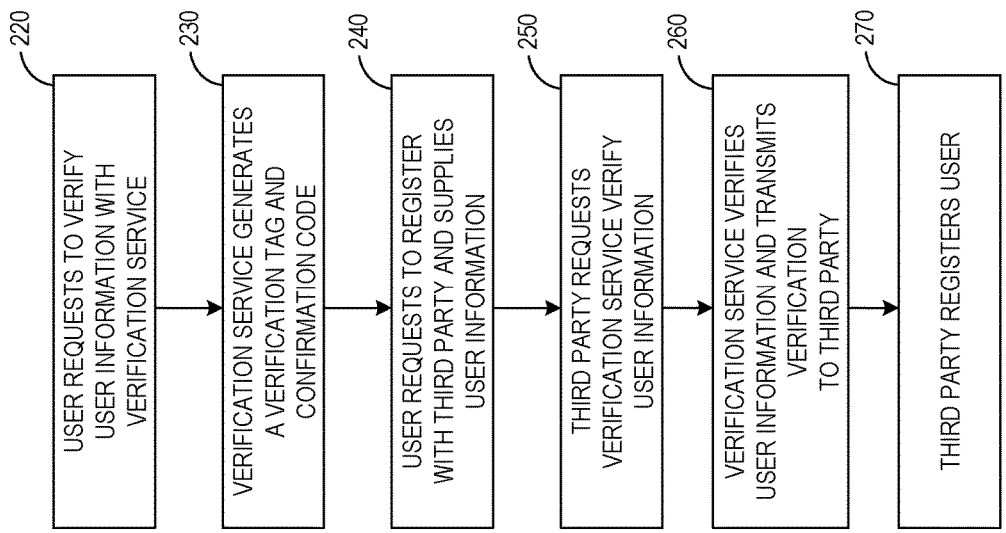
FIG. 2 is a flow diagram illustrating an example protected user information verification process according to some embodiments.

FIG. 2 is a flow diagram illustrating an example protected user information verification process. The process described herein may be performed by multiple computing devices of the protected user information verification system. Depending on the embodiment, the process of FIG. 2 may include additional or fewer blocks.

In block 220, the user provides, directly or indirectly, the user-specific information that the verification service will verify on behalf of the user. The user-specific information may include identifier information, contact information, payment information, other information, some combination thereof, etc. For purposes of illustration, many of the examples which follow—and those shown in the figures—relate to verification of user-specific identifier information. However, these examples are illustrative only and are not meant to limit the disclosure.

In some embodiments, the identifier information may comprise a phone number, a mailing address, an email address, an account user name, a screen name, a social media username, banking information (e.g., a bank account number or credit card number), or other information that may be linked to the user. In the example process of FIG. 2, the identifier information may be encrypted, hashed, padded, scrambled, transformed, obfuscated, or manipulated such that the actual content of the identifier information is protected and not readily discernible.

In block 230, the verification service may generate and store a verification tag and a confirmation code in a computer-readable storage device. In block 240, a user may request to register with a third party and may provide identifier information to the third party as part of the process. The third party may then send a request to the verification service to verify the identifier information in block 250. The process proceeds to block 260 where the verification service verifies the identifier information and transmits a verification message back to the third party. The identifier information may be encrypted or otherwise transformed such that the verification system may not be able to access the actual content of the identifier information once the verification service successfully receives it. As a result, the verification service in FIG. 2 may verify the identifier information and transmit a verification message without knowing the actual content of the received identifier information. Upon receiving the verification message, the third party may complete the user registration in block 270.

Example Verification Setup Process

Figure 3A:
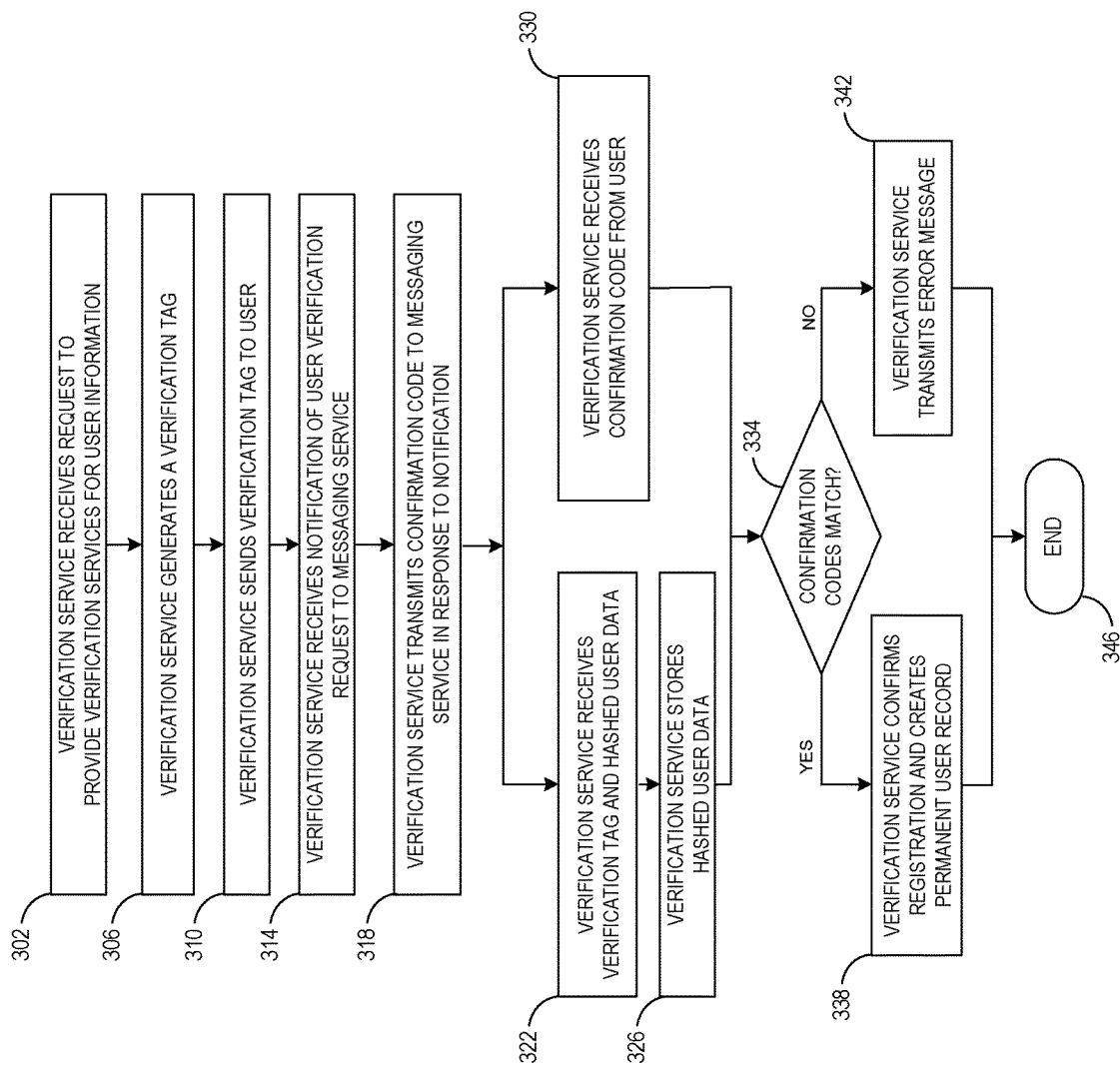
FIG. 3A is a flow diagram of an illustrative process for verification setup from the perspective of an example verification service according to some embodiments.
Figure 3B:
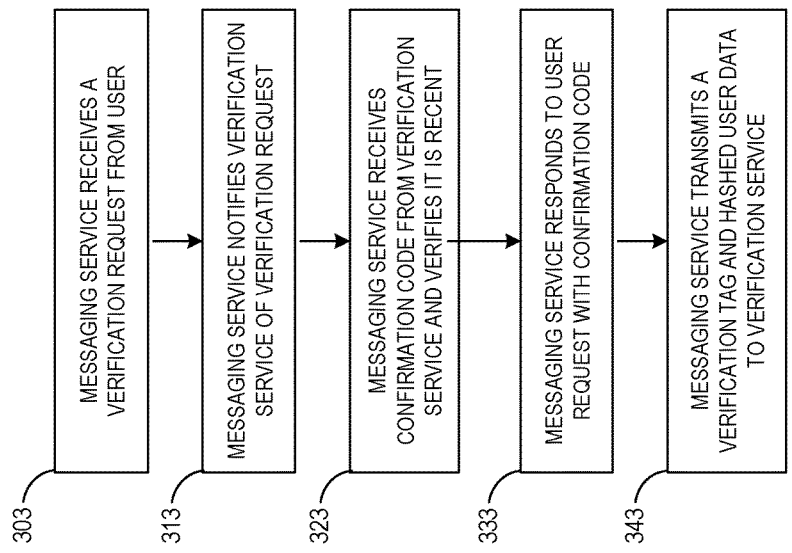
FIG. 3B is a flow diagram of an illustrative process for verification setup from the perspective of an example messaging service according to some embodiments.

FIGS. 3A and 3B are flow diagrams illustrating an example verification setup process. The example processes illustrated in FIGS. 3A and 3B assume the existence of a user device, a verification service, and a messaging service, such as those previously referenced in FIG. 1A.

The process illustrated in FIG. 3A embodies an example verification setup process from the point of view of a verification service. In block 302, the verification service may receive a request from a user to provide verification services for user information. In block 306, the verification service may generate and store a verification tag that is to be associated with the hashed user data eventually received from the messaging service. In block 310, the verification service may send the verification tag generated in block 306 to the user device.

In some embodiments, the verification tag may be a sequential, pseudo-randomly-generated, or algorithmically-determined number or alphanumeric string of characters that is uniquely associated with the user and/or the information to be verified. In some embodiments, the verification tag may include a plurality of numbers or characters to represent information. In one specific, non-limiting embodiment, the verification tag includes n total bytes, with a bytes representing a timestamp for the creation or expiration of the verification tag, b bytes representing an identifier of a service that has issued the verification tag, c bytes representing a type of information that the verification tag refers to (e.g., address, phone number, etc.), d bytes representing a version of the verification tag, e bytes for a pseudo-randomly generated number to avoid duplicates, etc. (wherein n, a, b, c, d, and e are numbers, and n>=a+b+c+d+e).

In block 314, the verification service may receive a notification from a messaging service that the user has transmitted a verification request to the messaging service. By way of example, the messaging service may be a service provider that transmits communications to various entities on behalf of, or in connection with services provided to, various other entities. In some embodiments, the notification may include the verification tag associated with the user.

In block 318, the verification service may respond to the notification and transmit a confirmation code, associated with the user-verified data entity that is the subject of the current verification setup process, to the messaging service. Afterwards, the process may proceed to blocks 322 or 330. In some embodiments, the confirmation code may be generated using one or more of the operations described above with respect to the verification tag. In some embodiments, the messaging service may generate the confirmation code and provide it to the verification service instead of receiving the confirmation code from the verification service.

In block 322, the verification service receives the verification tag associated with the user and a hashed user data from the messaging service. The hashed user data may comprise the user's information (e.g., identifier information, contact information, etc.) that has been encrypted, hashed, padded, scrambled, transformed, or manipulated such that the actual content of the user information is protected and not readily discernible. By way of example, a hash function (e.g., MD5 or SHA-256 algorithm) may be applied to the user's phone number to transform the phone number into hashed user data and obscure the original phone number. In some embodiments, the messaging service may transmit the verification tag and/or the hashed user data to the verification service prior to block 322. For example, the messaging service may transmit the verification tag and/or the hashed user data to the verification service at block 314, or at some other time during the process.

Upon receiving the hashed user data, the verification service may proceed to block 326, where the verification service stores the hashed user data. In some embodiments, the hashed user data may be stored in a non-transitory computer-readable storage medium in the verification service.

In block 330, the verification service may receive a confirmation code from the user. In some embodiments, the confirmation code may be received as a SMS text message, electronic mail message, alert, push notification, or other communication medium.

The steps embodied in blocks 322 and 326 and the step embodied in block 330 may be executed in any order. For example, in some embodiments, blocks 322 and 326 may be executed before block 330. In other embodiments, block 330 may be executed before blocks 322 and 326. In some embodiments, the blocks may be executed simultaneously.

Upon completion of both blocks 326 and 330, the example process may proceed to decision block 334. In decision block 334, the verification service may compare the confirmation code received in block 330 to the confirmation code previously generated and sent to (or received from) the messaging service in block 318. In the example process of FIG. 3A, the process proceeds to block 338 if the two confirmation codes match exactly, or to block 342 if there is no exact match. However, other matching criteria may be possible in other embodiments.

Assuming an exact match in block 334, the verification service may proceed to block 338 where the verification service confirms successful user registration. In some embodiments, a second record may be created and stored in a non-transitory computer-readable storage medium in the verification service. In some embodiments, the second record may comprise the verification tag associated with the user and the hashed user data.

Assuming no exact match in block 334, the verification service may proceed to block 342 and transmit a message, notification, or alert to the user device notifying the user of an unsuccessful registration attempt.

The process illustrated in FIG. 3B embodies the same example verification setup process from FIG. 3A, but from the point of view of a messaging service. In block 303, the messaging service may receive a verification request from a user device. In some embodiments, the received verification request may comprise a verification tag, associated with the user, and user-specific information. In some embodiments, the user information may be padded with a string of numbers or characters so that when the user information and padding are hashed, there is a reduced possibility that the un-hashed user information may be obtained through repeated guessing attempts. For example, some user information may be particularly susceptible to repeated guessing attempts by virtue of having a limited quantity of possible values, such as phone numbers, social security numbers, and the like. Upon receiving the verification request, the messaging service may notify the verification service of the verification request in block 313.

The messaging service may receive a response communication from the verification service in block 323 including a confirmation code. The messaging service may verify that the confirmation code was issued recently (e.g., within a threshold period of time) to reduce the chances that the code is no longer valid, to deter replay or guessing attacks, etc. For example, the messaging service may wish to verify that the confirmation code was issued within the preceding n seconds (where n is some number, such as 1, 2, 5, 10, etc.). In some embodiments, the messaging service may verify that the confirmation code was issued recently by examining timestamps of temporary records. For example, in some embodiments, a temporary record is created comprising a verification tag and an identifier of the user's device or browser. In some embodiments, the temporary record can be timestamped or made to automatically be deleted after a set period of time (e.g., after 1 hour). In some other embodiments, the confirmation code or verification tag itself may carry timestamp information. In some embodiments, as discussed above, the messaging service may generate the confirmation code and provide it to the verification service instead of receiving it from the verification service.

The messaging service may then proceed to block 333 and transmit the received confirmation code to the user device. After successfully responding to the user verification request, the messaging service may then encrypt, encode, pad, scramble, transform, or manipulate the received user information into hashed user data and transmit the hashed user data and the verification tag to the verification service in block 343. While the example process in FIG. 3B presents the steps in a specific sequential order, other processes may exist in other embodiments. For example, in other embodiments, the messaging service may transmit a verification tag and a hashed user data to the verification service before responding to the user request. In yet another embodiment, the messaging service may respond to the user request and transmit data to the verification service in parallel.

Example Protected User Information Verification Process

Figure 4A:
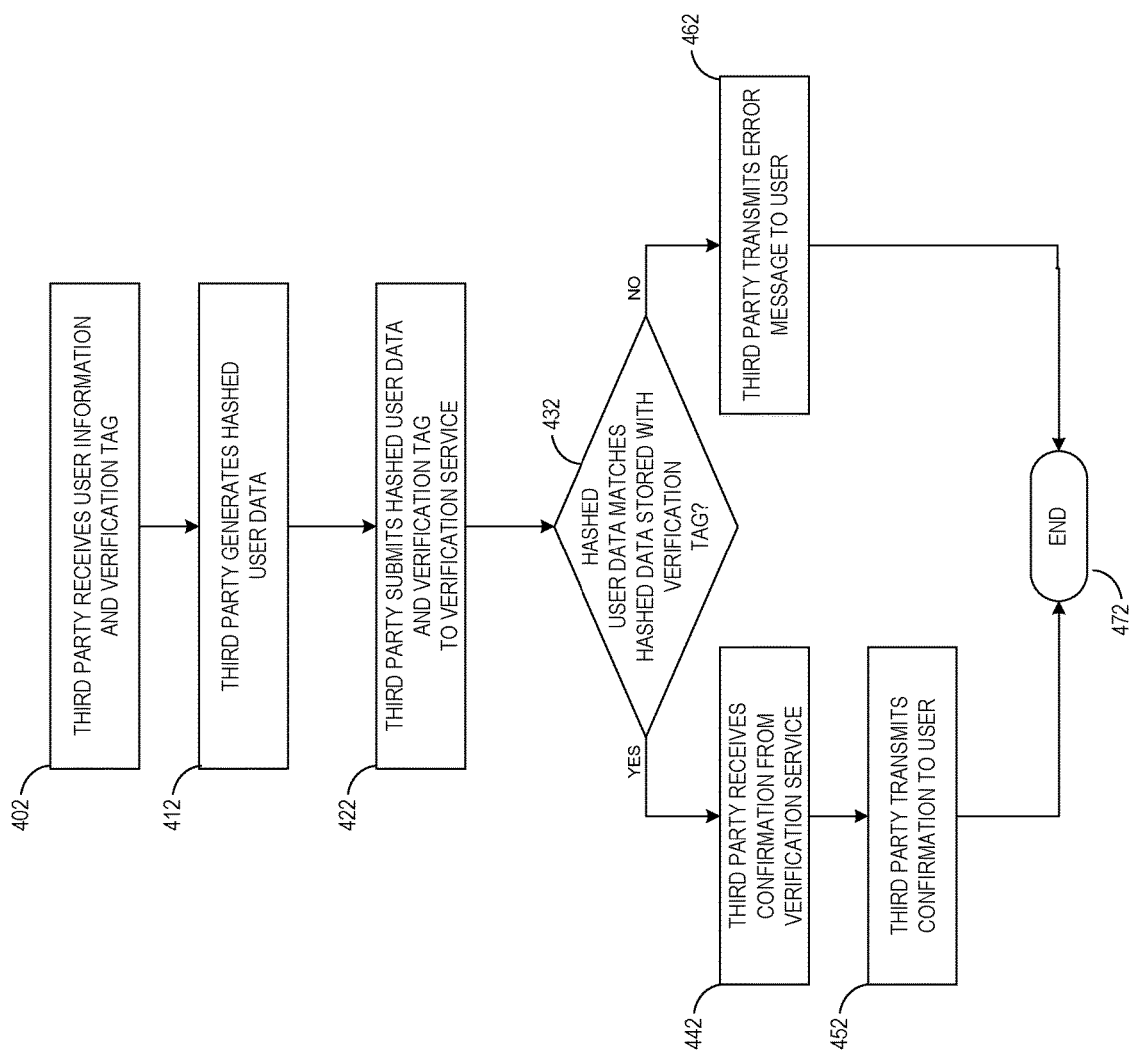
FIG. 4A is a flow diagram of an illustrative process for protected user information verification from the perspective of an example third-party system according to some embodiments.
Figure 4B:
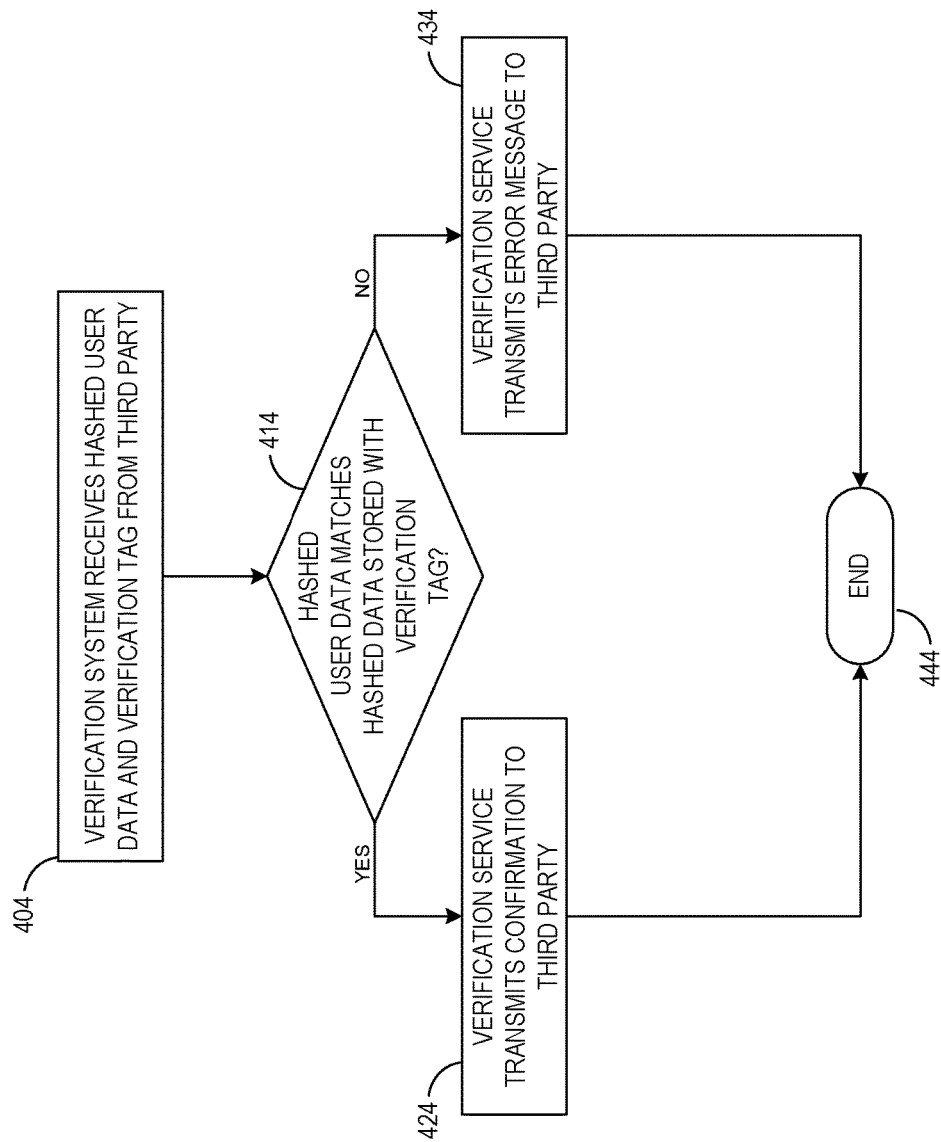
FIG. 4B is a flow diagram of an illustrative process for protected user information verification from the perspective of an example verification service according to some embodiments.

FIGS. 4A and 4B illustrate the example protected user information verification process described above, from different points of view. Specifically, FIG. 4A illustrates the example process from a third-party point of view, and FIG. 4B illustrates the example process from the verification service point of view. The example process embodied in FIGS. 4A and 4B assumes a successful execution of a verification setup process, such as the process embodied in FIGS. 3A and 3B. The example process embodied in FIGS. 4A and 4B also assumes that the user device and the verification service are the same as the user device and verification service mentioned when discussing the setup process embodied in FIGS. 3A and 3B. However, the assumption is not meant to limit the disclosed invention; other embodiments may exist where multiple user devices may be used (e.g., a verification setup process may be performed using one user device, and a subsequent verification process with a third-party system may be performed using a second user device).

The process in FIG. 4A begins in block 402 when a third party receives user information and a verification tag from a user device. For example, an online retailer may receive a communication from a potential customer's personal computer containing the potential customer's mailing address. Upon receiving the user information, the third party in block 412 may encrypt, encode, pad, scramble, transform, or manipulate the user information into hashed user data such that the original content of the user information is obscured.

In some embodiments, padding may be added to the user information prior to hashing. The addition of padding can help to lengthen relatively short user information (e.g., phone numbers, credit card numbers, etc.) so that the un-hashed user information cannot be guessed by repeatedly hashing sequential data. Illustratively, the padding may include a string of random characters appended to the user information. In some embodiments, the padding can be determined with reference to the user or the user's device, such as a universal accessible constant identifying the device (e.g., the device's serial number, a mobile phone's International Mobile Equipment Identity or "IMEI" number, a computer's hard drive serial number, etc.). For example, application software provided by or otherwise associated with the verification system may execute on the user's device. The application may be manually or automatically invoked to perform operations in the verification process. The application can determine a padding for user information based on a padding configuration that specifies the universal constant to be used, the amount of padding to apply, etc. The application can automatically generate a padded version of the user information with the appropriate padding. In some embodiments, the functionality described herein with respect to the application may execute within separate application that is not necessarily associated with the verification system. For example, code embedded into a web page may perform these functions, an applet or module may be access by other applications executing on the user's device, etc.

The length and distribution of the padding may vary across embodiments and may vary depending on the data to be protected. For example, a 10-digit phone number may be padded with 22 random characters after the phone number to create a hashed identifier data with a total length of 32 characters, while a 16-digit credit card number may be padded with 48 random characters inserted before the credit card number for a total length of 64 characters. If the user information is variable in length, padding may indicate the amount of padding added to the user information. For example, the padding may be added to the beginning of the user information, and the first n bytes may indicate the total length of the padding or the total length of the user data (wherein n is some number). As another example, n bytes in a specific location (e.g., always added at the beginning or always added at the end) may indicate the length of the padding, the location at which the padding begins or ends, the length of the user information, the location at which the user information begins or ends, etc.

After generating hashed user data in block 412, the third party may submit the hashed user data and verification tag to the verification service at block 422, and the process may proceed to block 432. If the verification service verifies that the hashed user data received from the third party matches the hashed user data that the verification services has stored in connection with the same verification tag, the process proceeds to block 442. Otherwise, the process proceeds to block 462. In some embodiments, the third party may request, from the verification service, the hashed user data that corresponds to the verification tag. Then the third party can compare the hashed user data received from the verification service to the hash user data that the third party has generated. In either instance, subsequent operations of the process may depend on whether the hashed user data generated by the third party matches with the data associated with the verification tag stored by the verification service.

Assuming that the hashed user data generated by the third party matches with the has user data associated with the verification tag stored by the verification service, the third party may receive a confirmation from the verification service in block 442. Upon receiving the confirmation from the verification service, the third party may then transmit a confirmation to the user device notifying the user of a successful confirmation and registration with the third party in block 452. However, assuming that there was no match in block 432, the process may instead proceed to block 462, and the third party may transmit an error message to the user device notifying the user of a failed confirmation and registration attempt. At block 472 the process may terminate.

FIG. 4B illustrates the same example process embodied in FIG. 4A but from the verification service point of view. The process begins in block 404 when the verification system receives hashed user data and a verification tag from the third party. After receiving the hashed user data and verification tag, the verification service in block 414 compares the received hashed user data with the data associated with the verification tag that was previously stored in a setup process similar to the one embodied in FIGS. 3A and 3B. In some embodiments, the verification service may confirm if the user information was verified by simply comparing the hashed user data with what the verification service has stored in its storage device in connection with the verification tag. By doing so, the verification service may confirm that user information claimed by a user has actually been verified without the verification service ever storing, receiving, or accessing the actual content of the user information, and without requiring additional verification steps by the user (e.g., responding to additional emails, texts, etc.).

Assuming an exact match in block 414, the verification service proceeds to block 424 and transmits a message to the third party confirming that the user's information has been successfully verified. Alternatively, if there was no match in block 414, the verification service proceeds to block 434 and transmits a message to the third party indicating that the user's information could not be successfully verified.

Example Data Flows and Actions

Figure 5A:
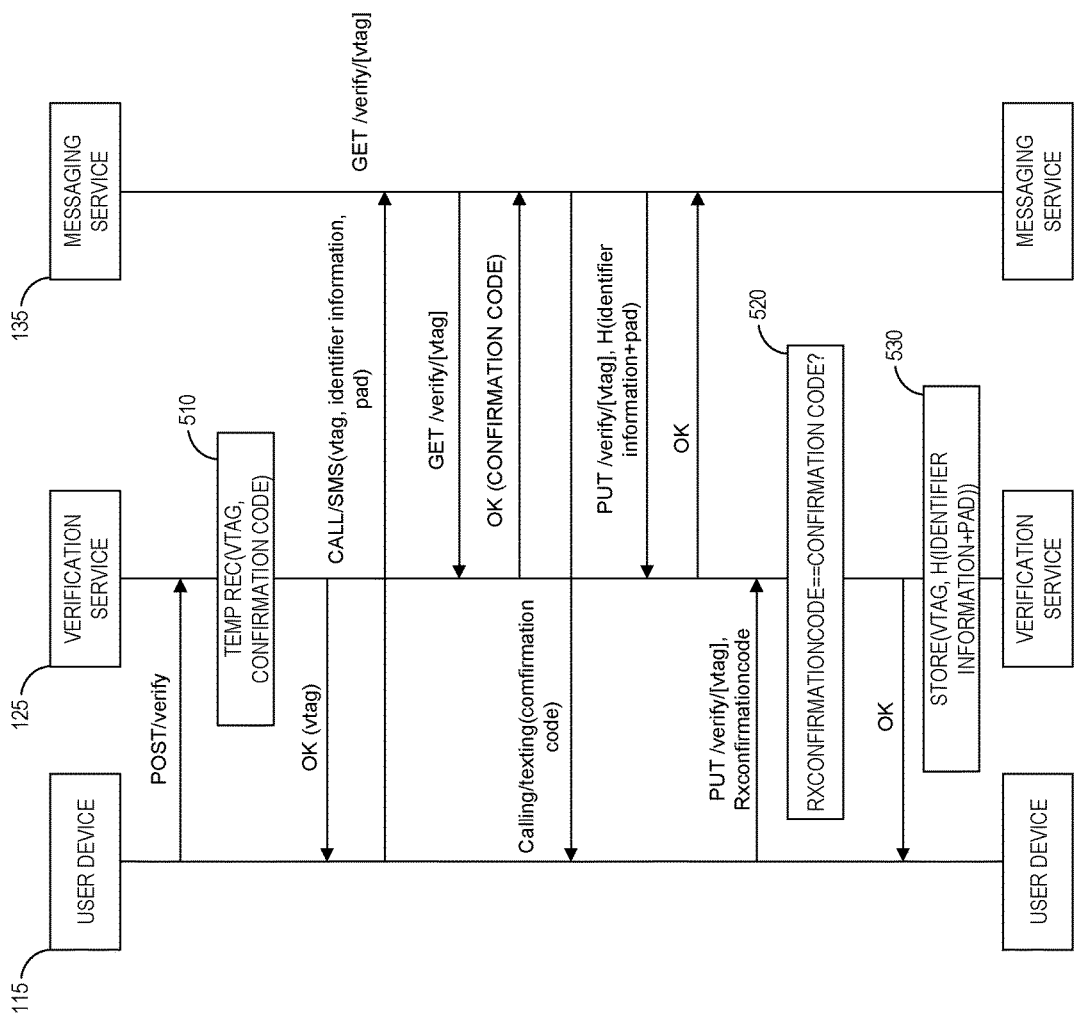
FIG. 5A is a diagram of illustrative data flows during verification setup according to some embodiments.

FIG. 5A is an example diagram that combines the processes embodied in FIGS. 3A and 3B into one visual diagram. Beginning from the top of the diagram and moving towards the bottom of the diagram, the user device 115, verification service 125, and messaging service 135 may transmit and receive communications sequentially according to the order the various process arrows appear in the diagram. However, blocks 510, 520, and 530 represent actions performed by the verification service alone. In block 510, the verification service may generate a temporary first record comprising a verification tag and a confirmation code. In block 520, the verification service determines whether the confirmation code received from the user device matches the confirmation code previously stored by the verification service in block 510. In block 530, the verification service creates a second record comprising a verification tag associated with the user, and hashed user data. While the diagram depicted in FIG. 5A illustrates a particular sequence in which messages or information are sent to and from the user device 115, verification service 125, and messaging service 135, in some embodiments the operations may occur in a different sequence.

Figure 5B:
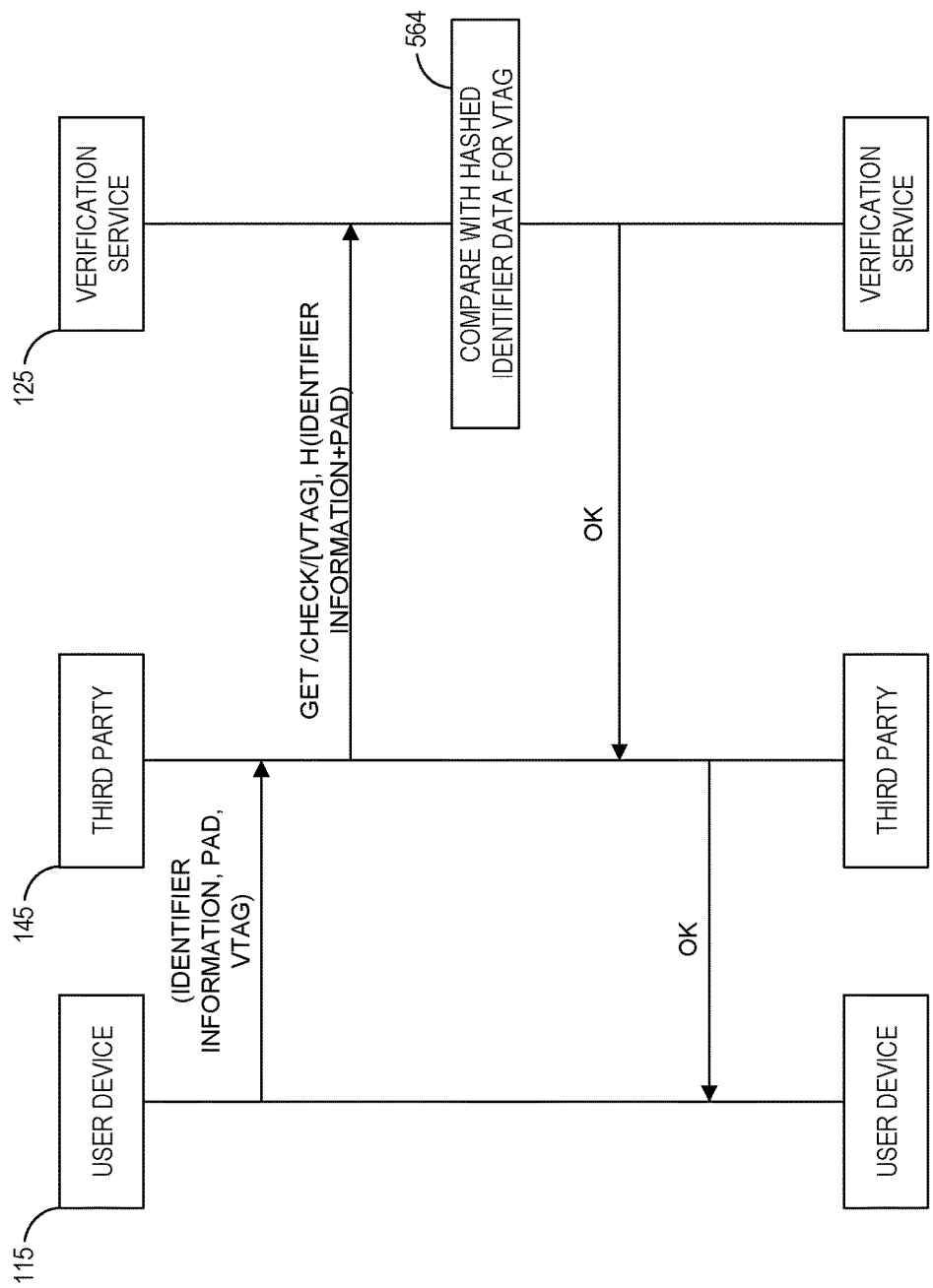
FIG. 5B is a diagram of illustrative data flows during protected user information verification according to some embodiments.

FIG. 5B is an example diagram that combines the processes embodied in FIGS. 4A and 4B into one visual diagram. Beginning from the top of the diagram and moving towards the bottom of the diagram, the user device 115, third party 145, and the verification service 125 may transmit and receive communications sequentially according to the order the various process arrows appear in the diagram. However, block 564 represents an action performed by the verification service alone. In block 564, the verification service may determine whether the received hashed identifier data matches with the data associated with the received verification tag that was previously stored with the verification service in FIG. 5A. While the diagram depicted in FIG. 5B illustrates a particular sequence in which messages or information are sent to and from the user device 115, third party 145, and verification service 125, in some embodiments the operations may occur in a different sequence. In addition, although the diagram in FIG. 5B illustrates the verification service 125 performing the comparison in block 564, in some embodiments the third party 145 may perform the comparison, as discussed in greater detail above.

Example Computing System

Figure 6:
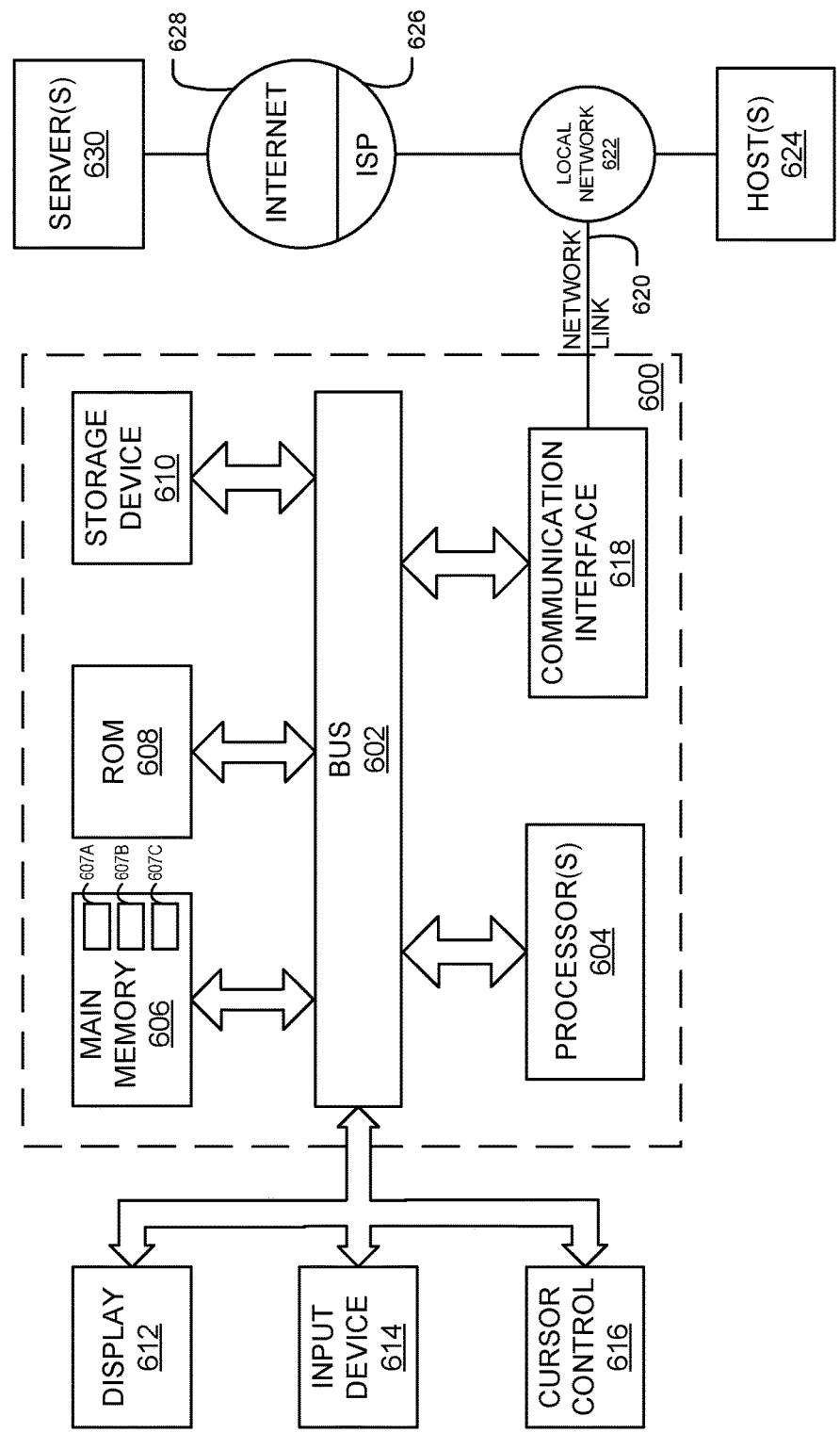
FIG. 6 is a block diagram of an example computing system configured to perform protected user information verification according to some embodiments.

FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more compute program instructions contained in main memory 606. In some embodiments, main memory 606 may be divided into multiple partitions 607A, 607B, or 607C, each partition configured to contain program instructions or other data. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer-readable storage media may be involved in carrying one or more sequences of one or more computer-readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A verification system comprising:
a data storage device; and
one or more computing devices programmed by executable instructions to:
receive, from a requesting computing system, a verification request comprising a verification tag and a hashed version of a user data entity, wherein the hashed version of the user data entity comprises a hash of the user data entity and padding data, and wherein the requesting computing system sends the verification request to the verification system in response to receiving, from a user computing system, the verification tag and a non-hashed version of the user data entity;
obtain, from the data storage device, a hashed user-verified data entity associated with the verification tag;
determine that the hashed user-verified data entity matches the hashed version of the user data entity; and
send, to the requesting computing system, a verification confirmation in response to determining that the hashed user-verified data entity matches the hashed version of the user data entity,
wherein no non-hashed version of the user data entity is received by the verification system.

2. The verification system of claim 1, wherein the padding data is based at least partly on an identifier associated with the user computing system.

3. The verification system of claim 1, wherein the padding data is based at least partly on a type of the user data entity.

4. The verification system of claim 1, wherein the hashed user-verified data entity comprises a hashed version of one of: a phone number, an email address, a username, a social security number, or a password.

5. The verification system of claim 1, wherein the verification tag comprises a first subset of bytes representing a type of the user data entity, and a second subset of bytes representing a version of the verification tag.

6. The verification system of claim 1, further comprising an application configured to execute on the user computing system and cause the user computing system to:
obtain the verification tag;
obtain the non-hashed version of the user data entity associated with the verification tag;
determine the padding data, wherein the padding data is associated with the user computing system;
generate user information based on the non-hashed version of the user data entity and the padding data; and
send the user information and the verification tag to the requesting computing system, wherein the requesting computing system generates the hashed version of the user data entity using the user information.

7. The verification system of claim 6, wherein the application being configured to cause the user computing system to determine the padding data comprises the application being configured to cause the user computing system to at least:
  determine a length of the padding data based at least partly one of: a length of the user data entity, or a type of the user data entity; and
  determine a location within the user information at which the padding data is to be placed with respect to the user data entity.

8. The verification system of claim 1, wherein the one or more computing devices are programmed by further executable instructions to:
  receive, from the user computing system, a first verification setup request prior to receiving the verification request;
  generate the verification tag;
  send the verification tag to the user computing system; and
  receive, from a third-party computing system, a notification of a second verification setup request by the user computing system, the notification of the second verification setup request comprising the verification tag and the hashed user-verified data entity.

9. The verification system of claim 8, wherein the one or more computing devices are programmed by further executable instructions to:
  generate a confirmation code;
  send the confirmation code to the third-party computing system;
  receive the confirmation code from the user computing system; and
  in response to receiving the confirmation code from the user computing system:
    associate the hashed user-verified data entity with the verification tag; and
    store the hashed user-verified data entity in data storage device.

10. A computer-implemented method comprising:
  as implemented by a verification system comprising one or more computer processors configured to execute specific instructions:
    receiving, from a requesting computing system, a verification request comprising a verification tag and an obfuscated version of a user data entity, wherein the obfuscated version of the user data entity comprises a hash of the user data entity and padding data, and wherein the requesting computing system sends the verification request to the verification system in response to receiving, from a user computing system, the verification tag and a non-obfuscated version of the user data entity;
    obtaining, from a data storage device, an obfuscated user-verified data entity associated with the verification tag;
    determining that the obfuscated user-verified data entity matches the obfuscated version of the user data entity; and
    sending, to the requesting computing system, a verification confirmation in response to determining that the obfuscated user-verified data entity matches the obfuscated version of the user data entity,
    wherein no non-obfuscated version of the user data entity is received by the verification system.

11. The computer-implemented method of claim 10, wherein the padding data is based at least partly on an identifier associated with the user computing system.

12. The computer-implemented method of claim 10, wherein the padding data is based at least partly on a type of the user data entity.

13. The computer-implemented method of claim 10, wherein receiving the verification request comprising the obfuscated version of the user data entity comprises receiving the verification request comprising a hashed version of one of: a phone number, an email address, a username, a social security number, or a password.

14. The computer-implemented method of claim 10, wherein receiving the verification request comprising verification tag comprises receiving the verification request comprising a first subset of bytes representing a type of the user data entity, and a second subset of bytes representing a version of the verification tag.

15. The computer-implemented method of claim 10, further comprising:
  as implemented by the user computing system:
    obtaining the verification tag;
    obtaining the non-obfuscated version of the user data entity associated with the verification tag;
    determining the padding data, wherein the padding data is associated with the user computing system;
    generating user information based on the non-obfuscated version of the user data entity and the padding data; and
    sending the user information and the verification tag to the requesting computing system, wherein the requesting computing system generates the obfuscated version of the user data entity using the user information.

16. The computer-implemented method of claim 15, wherein the user computing system determining the padding data comprises:
  determining a length of the padding data based at least partly one of: a length of the user data entity, or a type of the user data entity; and
  determining a location within the user information at which the padding data is to be placed with respect to the user data entity.

17. The computer-implemented method of claim 10, further comprising:
  receiving, from the user computing system, a first verification setup request prior to receiving the verification request;
  generating the verification tag;
  sending the verification tag to the user computing system; and
  receiving, from a third-party computing system, a notification of a second verification setup request by the user computing system, the notification of the second verification setup request comprising the verification tag and the obfuscated user-verified data entity.

18. The computer-implemented method of claim 17, further comprising:
  generating a confirmation code;
  sending the confirmation code to the third-party computing system;
  receiving the confirmation code from the user computing system; and
  in response to receiving the confirmation code from the user computing system:
    associating the obfuscated user-verified data entity with the verification tag; and storing the obfuscated user-verified data entity in data storage device.

* * * * *